US012427643B2

(12) United States Patent
Harwood et al.

(10) Patent No.: US 12,427,643 B2
(45) Date of Patent: Sep. 30, 2025

(54) HANDLE SYSTEM WITH STORAGE FOR WOODWORKING TOOLS

(71) Applicant: Ashley Harwood LLC, Charleston, SC (US)

(72) Inventors: Ashley Harwood, Charleston, SC (US); Donald Martin Zierold, Cleveland, TN (US); James Lawrence Lytle, Jr., Fletcher, NC (US)

(73) Assignee: Ashley Harwood LLC, Charleston, SC (US)

( * ) Notice: Subject to any disclaimer, the term of this patent is extended or adjusted under 35 U.S.C. 154(b) by 435 days.

(21) Appl. No.: 18/045,715

(22) Filed: Oct. 11, 2022

(65) Prior Publication Data

US 2023/0115220 A1 Apr. 13, 2023

Related U.S. Application Data

(60) Provisional application No. 63/254,749, filed on Oct. 12, 2021.

(51) Int. Cl.
*B27G 15/00* (2006.01)
*B25G 3/12* (2006.01)

(52) U.S. Cl.
CPC .............. *B25G 3/12* (2013.01); *B27G 15/00* (2013.01)

(58) Field of Classification Search
CPC .......... B27G 13/00; B27G 21/00; B25G 1/08; B25G 3/16; B25G 3/12; B23B 31/113; B23B 31/11; B23B 2231/04
USPC ........................................................ 142/56
See application file for complete search history.

(56) References Cited

U.S. PATENT DOCUMENTS

| | | | | |
|---|---|---|---|---|
| 8,800,613 B2 | 8/2014 | Batty | | |
| 10,889,013 B2 | 1/2021 | Scimone et al. | | |
| 2012/0006448 A1* | 1/2012 | Batty | B27G 15/00 | 76/119 |
| 2012/0267008 A1* | 10/2012 | Batty | B27G 15/00 | 76/119 |
| 2021/0076902 A1* | 3/2021 | Neumann | A47L 25/005 | |
| 2023/0356312 A1* | 11/2023 | Wilkinson | B27G 17/06 | |

FOREIGN PATENT DOCUMENTS

CN 210414626 U 4/2020

OTHER PUBLICATIONS

English translation of CN 210414626 (Year: 2020).*
International Search Report dated Dec. 30, 2022 issued in PCT/US22/77914.
Written Opinion dated Dec. 30, 2022 issued in PCT/US22/77914.

* cited by examiner

*Primary Examiner* — Alan Snyder
(74) *Attorney, Agent, or Firm* — Kubota & Basol LLP

(57) ABSTRACT

The present invention is for a handle system for a woodworking tool to allow both the safe stowage of a woodworking tool and the operational use of the woodworking tool. A handle configured with a first collet receiver and a second collet receiver interconnected at either end of a generally hollow longitudinal handle. The collet receivers are adapted for receiving and interconnecting with a collet, and the collet is configured to receive and hold a woodworking tool therein. The first collet receiver enables the stowage of the woodturning tool within the longitudinal handle, and the second collet receiver enables the use of the woodturning tool in a working configuration which constrains the woodturning tool extending axially away from the longitudinal handle.

14 Claims, 8 Drawing Sheets

SECTION C-C

SECTION F-F

HANDLE SYSTEM WITH STORAGE FOR WOODWORKING TOOLS

CROSS REFERENCE TO RELATED APPLICATIONS

This application claims the benefit of U.S. Provisional Patent Application 63/254,749 entitled "HANDLE SYSTEM WITH STORAGE FOR WOODWORKING TOOLS" filed on Oct. 12, 2021, the entire contents of which are incorporated herein by reference in its entirety for all purposes.

FIELD OF THE INVENTION

The present invention is directed to a handle system configured to receive woodworking tools in a first configuration for use during woodworking processes, and to receive the woodworking tools in a second configuration for storage when not in use such that the woodworking tools are stored within the handle system in a manner which prevents damage to the tool when stored or transported.

BACKGROUND OF THE INVENTION

Woodturning tools surround the use of a sharpened cutting tool which is configured to be held statically in relation to a piece of wood which is rapidly rotated, typically between 50-2500 RPM, about an axis on machinery such as a lathe. The static cutting tool having a sharpened distal end is advanced toward and into the surface of the piece of wood to carve a desired profile or shape into the piece of wood as it turns.

Due to the speed at which the wood piece rotates, a craftsperson (also known as a "woodturner") is able to effectively make identical radius cuts around the axis of rotation. For this reason, woodturning is particularly advantageous when manufacturing items having at least one portion having a circular cross section in relation to an axis of rotation. For example—Finished pieces which are commonly made with woodturning, each typically having a circular cross-section about an axis, include spindle legs for furniture, baseball bats, candlestick holders, and bowls.

Cutting tools which are commonly used by woodturners include, but are not limited to gouges, parting tools, scrapers, and skews. Each of these cutting tools provide a particular function and are available in a variety and shapes and sizes. Woodturning tools are commonly affixed to a handle which is axially aligned with the handle to provide a woodturner a comfortable handle and leverage as the end is advanced into the rotating wood.

The use of dull woodturning tools not only provides less than desirable results in surface finish on a turned piece of wood, but can also result in dangerous scenarios when woodturning. Dull woodturning tools require excessive force when attempting to cut into the rotating wood. Using excessive force can dislodge a piece of wood from the lathe can dislodge the wood piece from the fixturing mechanisms and result in damage to the piece, damage to equipment, injury to the woodturner, and death in extreme cases.

Because of the importance of the sharpness of woodturning tools, it is important that woodturning tools are stored and transported in a manner that protects the distal end from damage. If distal end of a woodturning tool is damaged, such as with edge deformation or chipping, time must be taken to grind out the damaged section prior to resharpening the tool, or risk working with a dulled woodturning tool.

The proper storage of woodturning tools in a workshop is sometimes accomplished with wall-mounted or free-standing tool racks which prevent damage to the distal end. However, such solutions take up space which is at a premium for hobbyists who do not have a dedicated space for their craft. As such, placing woodturning tools into drawers or onto tabletops can result in damage and dulling to the cutting edge of the woodturning tools.

When woodturning tools are placed into drawers or placed on tabletops, there is an increased possibility of a user coming into contact with a cutting edge of the woodturning unintentionally. Due to the need to maintain sharp woodturning tools, it will be appreciated that unintended contact with the cutting edge of the woodturning tool may result in injury due to laceration. It is a further aspect of the present invention to provide storage for a woodturning tool when not in use to mitigate unintended contact with the cutting edge, thus mitigating chance of injury.

Furthermore, woodturners often travel to shops of colleagues, to classes, to tradeshows, and symposiums where they wish to bring their woodturning tools with them. Currently the options for shipping and/or travelling with woodturning tools is difficult due to the long and sharp nature of the woodturning tools, and doing so while preventing damage to the woodturning tools is difficult.

Thus, there is a need for a solution for safely storing and transporting woodturning tools in order to protect the woodturning tools from damage.

SUMMARY OF THE INVENTION

It is an aspect of certain embodiments of the present invention to comprise a handle wherein the first end of the handle is configured to receive a woodturning tool, commonly a longitudinal tool, for use during woodturning operations, and wherein the second end of the handle is configured to receive a woodturning tool therethrough for storage within the handle for storage and transport. While the present invention is directed toward the use of a woodturning tool, the use of alternate woodworking tools are within the spirit and scope and the terms "woodturning tool" and "woodworking tool" are used interchangeably herein.

Existing technologies, such as U.S. Pat. No. 8,800,613 to Batty ("Batty")—incorporated herein by reference in its entirety for all purposes—teach one of many solutions to allowing the interchangeability of a woodturning tool by interconnecting the woodturning tool to a collet, and the collet being interconnectable with a collet receiver disposed at a first end of a handle. However, Batty does not address the challenges surrounding the prevention of damage of such tools when they are not in use such as when stored or in transport.

It is an aspect of the present invention to store gouges, and other oblong cutting tools, within a second end of a hollow handle wherein a user can use the handle in a working configuration for use in processes such as woodturning by affixing the tool to the an end of the handle, and can alternatively configure the handle in a storage configuration for storage or transportation by affixing the tool within the handle by interconnecting the tool to the alternate end of the handle.

It is an aspect of the present invention that a woodturning tool is removably interconnectable to a first end of a handle or a second end of a handle in a manner that does not require specialized tools to interconnect to or disconnect the woodturning tool from the first end of the handle or the second end of the handle.

In certain embodiments, an end of the longitudinal handle comprises a collet receiver configured to interconnect with a first end of a collet in a stowed configuration. The collet receiver of such embodiments is configured to interconnect with a first end of a collet through use of an interconnection mechanism such as threaded features, magnetic interconnection, camlock connection, bayonet mount connection, press-fit connection, or a combination thereof. Connections between the first end of the collet and the collet receiver beyond connection types disclosed herein, and alternate interconnection strategies are within the scope and spirit of the present invention. Interconnection between the first end of the collet and a collet receiver allows for the storage of a woodturning tool within the handle for storage.

In certain embodiments, an end of the longitudinal handle comprises a collet receiver configured to interconnect with a second end of a collet in a working configuration. The collet receiver of such embodiments configured to interconnect with a second end of a collet through use of interconnections such as threaded features, magnetic interconnection, camlock connections, bayonet mount connection, press-fit connection, snap-fit connection, or a combination thereof. Connections between the collet and the collet receiver are not limited to connection types disclosed herein and alternate interconnection strategies are within the scope and spirit of the present invention.

Furthermore, a user may desire the interchangeability of tools wherein a first collet with first tool interconnected thereto are interconnected to the first end of the handle in a stowed configuration, and wherein a second collet with a second tool interconnected thereto are interconnected and a second collet with second tool interconnected thereto are interconnected to the second end of the handle in a working configuration.

Further still, it may be desired to disconnect a collet with tool interconnected thereto from a first handle in a working configuration, and interconnect the collet and tool to a second handle in a working configuration, wherein the handle comprises a shorter or longer length as may be desired by the user. A longer or shorter length handle may be desired based upon the process and leverage the user desires for the particular process.

In certain embodiments, a user can interchangeably interconnect the first end of a collet with a collet receiver, and a second end of the collet with a second collet receiver without the use of specialized tools allowing transition between a working configuration and a stored configuration with ease. Embodiments comprising a single collet receiver configured to interconnect with a first end of a collet, and a second end of a collet are within the spirit and scope of the present invention.

These and other advantages will be apparent from the disclosure of the inventions contained herein. The above-described embodiments, objectives, and configurations are neither complete nor exhaustive. Other embodiments of the invention are possible using, alone or in combination, one or more of the features set forth above or described in detail below. Further, this Summary is neither intended nor should it be construed as being representative of the full extent and scope of the present invention. The present invention is set forth in various levels of detail in this Summary, as well as in the attached drawings and the detailed description below, and no limitation as to the scope of the present invention is intended to either the inclusion or non-inclusion of elements, components, etc. in this Summary. Additional aspects of the present invention will become more readily apparent from the detailed description, particularly when taken together with the drawings, and the claims provided herein.

DETAILED DESCRIPTION OF VARIOUS EMBODIMENTS

Figure 1:
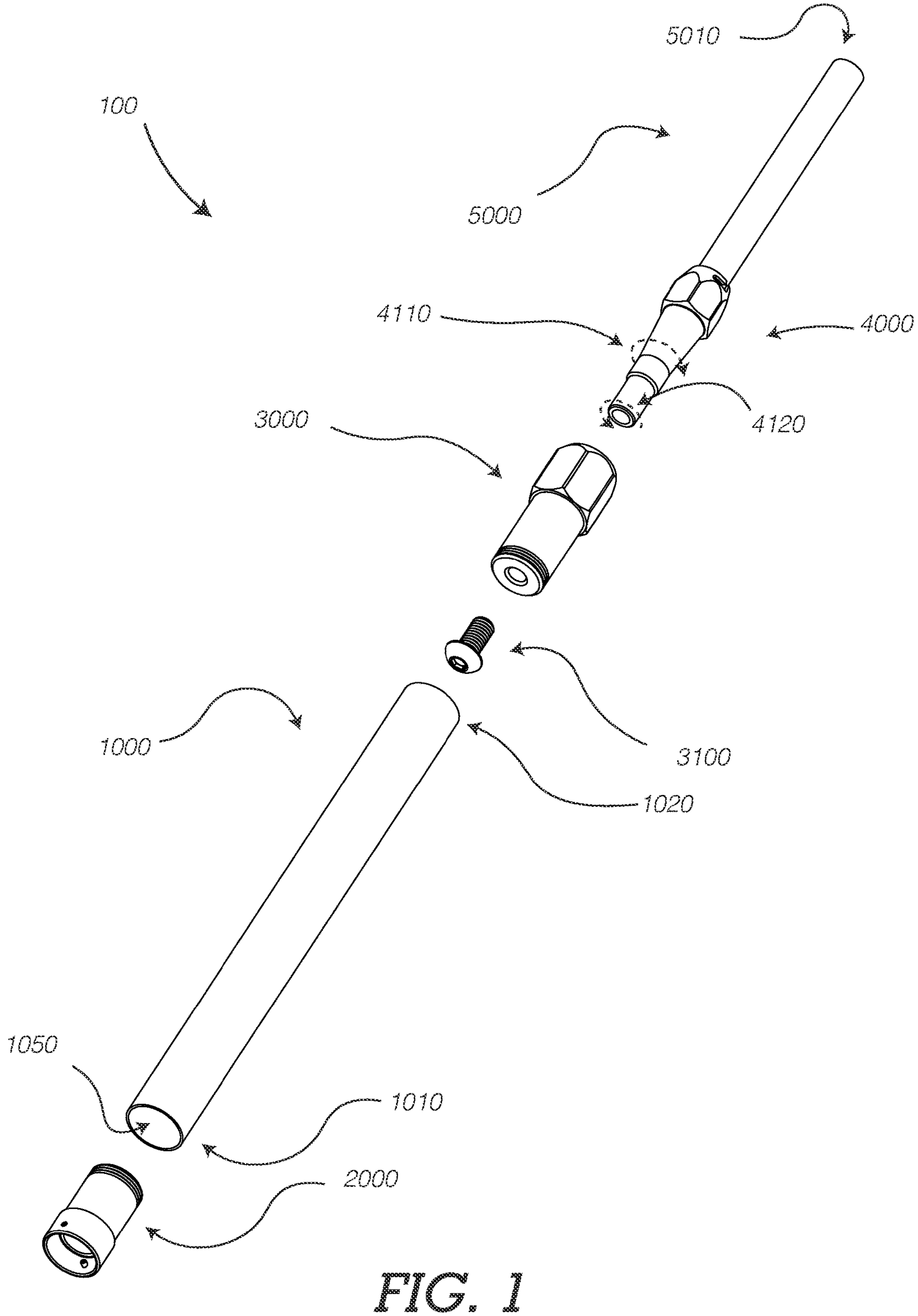
FIG. 1—A perspective exploded view of certain embodiments of a handle system for woodturning tools FIG. 2A—A side view of a collet receiver of certain embodiments FIG. 2B—A section view of the collet receiver of FIG. 2A FIG. 3A—A side view of a collet receiver of certain embodiments FIG. 3B—A section view of the collet receiver of FIG. 3A FIG. 4A—A side view of a collet of certain embodiments FIG. 4B—A section view of the collet of FIG. 3A FIG. 5A—A side view of a collet of certain embodiments FIG. 5B—A detail view of the collet of FIG. 5A FIG. 6—A side disassembled view of certain embodiments of a handle system for woodturning tools FIG. 7A—A side view of certain embodiments of a handle system for woodturning tools in a stowed configuration FIG. 7B—A section view of the handle system of FIG. 7A FIG. 8A—A side view of certain embodiments of a handle system for woodturning tools in a working configuration FIG. 8B—A section view of the handle system of FIG. 8A

Certain embodiments of a handle system 100, as shown in FIG. 1-FIG. 4A for example, discussed herein comprise a handle 1000 with longitudinal form, with a hollow aspect 1050 extending longitudinally through the handle. The handle 1000 comprises a first collet receiver 2000 at a first end 1010 of the handle, wherein the first collet receiver 2000 is configured to interconnect with a collet 4000. The first collet receiver 2000 comprises a hollow aspect 2050 that extends longitudinally through a distal end 2010 of the first collet receiver. In certain embodiments the hollow aspect 2050 of the first collet receiver comprises a cylindrical shape, however alternate embodiments comprising a cross section of alternate shapes such as hexagonal, octagonal, or other polygonal, or ovoid shapes are within the spirit and scope of the present invention. The first collet receiver 2000 is interconnected to the first end 1010 of the handle, wherein the hollow aspect 2050 of the collet receiver aligns with and is in communication with the hollow aspect 1050 of the handle and the first end 1010 of the handle. In certain embodiments, the hollow aspect 2050 of the collet receiver is coaxial with the hollow aspect 1050 of the longitudinal handle. The first collet receiver 2000 is configured to interconnect with a collet 4000 wherein the first end 2010 of the collet receiver is configured to interconnect with the first end 4010 of the collet. In certain embodiments, a second collet receiver 3000 is configured to interconnect with the second end 4020 of the collet. Embodiments comprising a first collet receiver 2000 configured to interconnect with a first end 4010 of a collet, and a second collet receiver 3000 configured to interconnect with a second end 4020 of the collet, are within the spirit and scope of the present invention.

Certain embodiments comprise a collet 4000 which comprises a first end 4010 and a second end 4020, wherein a woodturning tool 5000 can be attached to the collet 4000 by inserting the woodturning tool into the hollow aspect 4050 of the collet through the first end 4010 of the collet. A first collet receiver 2000 is configured to interconnect with the first end 4010 of the collet. The collet 4000 is interconnectable with a collet receiver (2000, 3000) by engaging an interconnection mechanism between the collet and the collet receiver.

In certain embodiments, shown in FIG. 1-FIG. 5B for example, the collet 4000 is interconnected with the first collet receiver 2000 by inserting the first end of the collet 4010 into the hollow aspect 2050 of the first collet receiver, then rotating the collet in a first direction 4110. In such embodiments, the hollow aspect 2050 of the first collet receiver extends from the distal first end 2010 of the first collet receiver and through the second end 2020 of the first collet receiver. Therefore, a collet 4000 holding a woodturning tool 5000 can interconnect with the first collet receiver by inserting the distal end 5010 of the woodturning tool through the first end of the first collet receiver 2010 and through the hollow aspect 2050 of the first collet receiver, wherein the woodturning tool 5000 extends into the hollow aspect 1050 of the longitudinal handle until the first end of the collet 4010 abuts and interconnects with the first end 2010 of the first collet receiver 2000.

In certain embodiments, shown in FIG. 1-FIG. 7B for example, the first end 4010 of a collet interconnects with a first distal end 2010 of a first collet receiver with a bayonet mount. The first end 4010 of the collet comprises at least one keyway 4200. In certain embodiments the keyway 4200 is in an external surface 4205 of the collet. The keyway 4200 comprises a first channel segment 4210 extending longitudinally away from the first end 4010 of the collet toward the second end 4020 of the collet, and a second channel 4220 segment extending in a second direction 4120 circumferentially around at least a portion of the collet 4000. The first end 2010 of a first collet receiver is configured to interconnect with a first end 4010 of a collet, comprises a key 2100, such as a pin. In certain embodiments the key 2100 is interconnected with an internal aspect 2205 of the first collet receiver. The key 2100 is configured to slide within the keyway 4200. To interconnect the collet 4000 with the first collet receiver 2000, the first end 4010 of the collet is advanced axially toward the first distal end 2010 of the first collet receiver such that the key 2100 slides longitudinally within the first segment 4210 of the keyway toward the second end 4020 of the collet. The collet 4000 is then rotated in a first direction 4110, thus sliding the key 2100 circumferentially along the second segment 4220 of the keyway and placing the collet in a stowed or locked configuration 6000. In a stowed or locked configuration 6000 the woodturning tool 5000 is stowed within the hollow aspect of the handle 1050 wherein the woodturning tool 5000 is kept parallel with the handle 1000 prevented from impacting the handle 1000, thus preventing the dulling of the woodturning tool 5000. In certain embodiments the woodturning tool 5000 is stowed coaxially within the longitudinal handle 1000 in a stowed configuration 6000. Rotating the collet 4000 in the second direction 4120 thereby places the collet in an unlocked configuration 6050 which disconnects and allows the removal of the collet 4000 from the first collet receiver 2000. In certain embodiments, the first end 2010 of the first collet receiver comprises a plurality of keys 2100 and the first end of the collet comprises a plurality of keyways 4200 wherein the keys 2100 are configured to engage with the keyways 4200. In certain embodiments the collet 4000 comprises two keyways 4200, and the first end of the collet comprises two keys 2100, wherein the keyways 4200 are 180-degrees angularly offset from each other, and the keys 2100 are 180-degrees angularly offset from each other. Furthermore, embodiments wherein a collet comprising keys, and a collet receiver comprising keyways wherein the keys are configured to interconnect with the keyways thereby interconnecting the first end of the collet with the first distal end of the collet receiver are within the spirit and scope of the present invention.

Figure 2A:
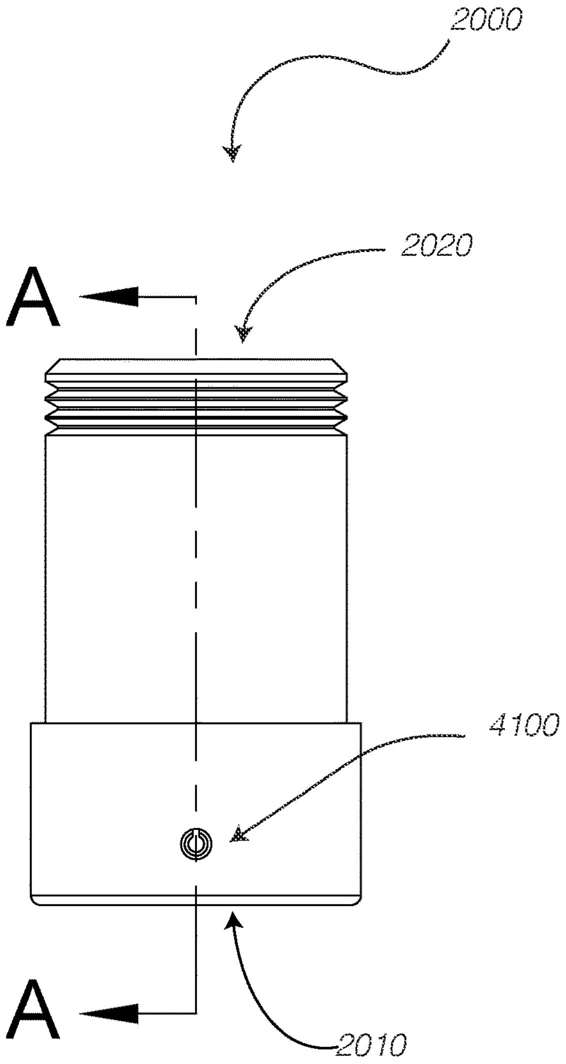
Figure 2B:
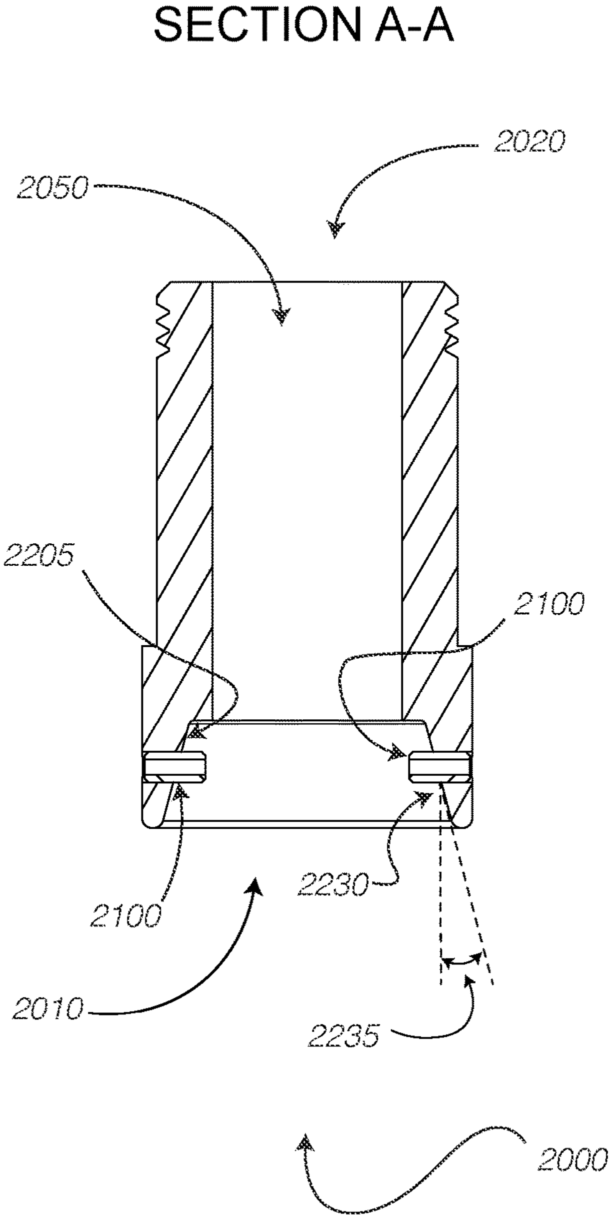
Figure 3A:
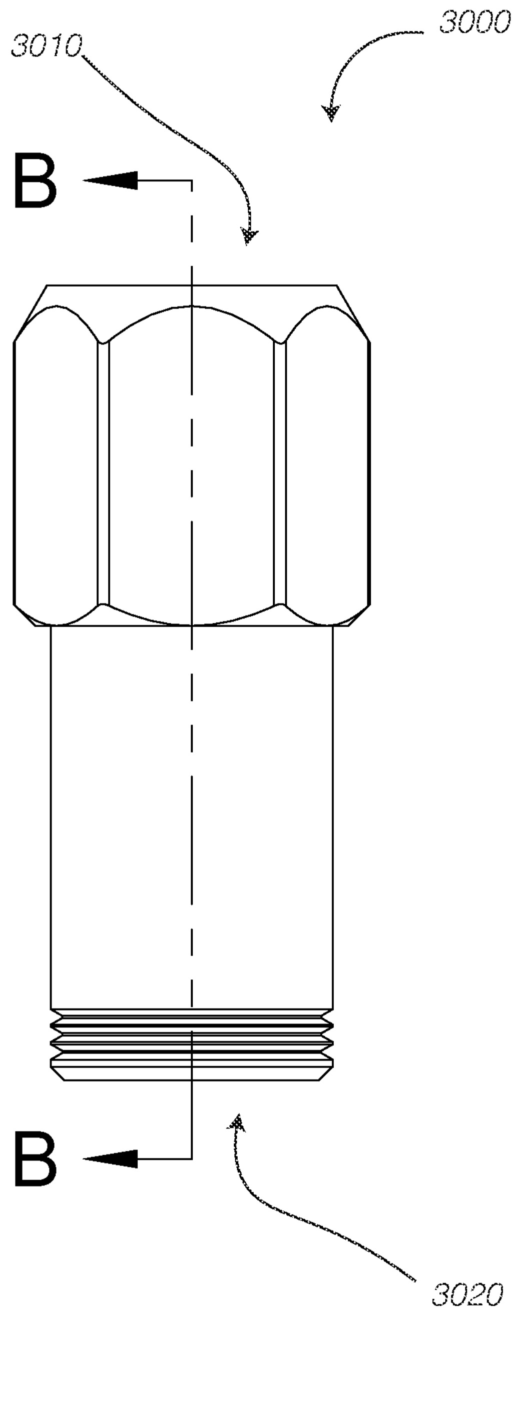
Figure 3B:
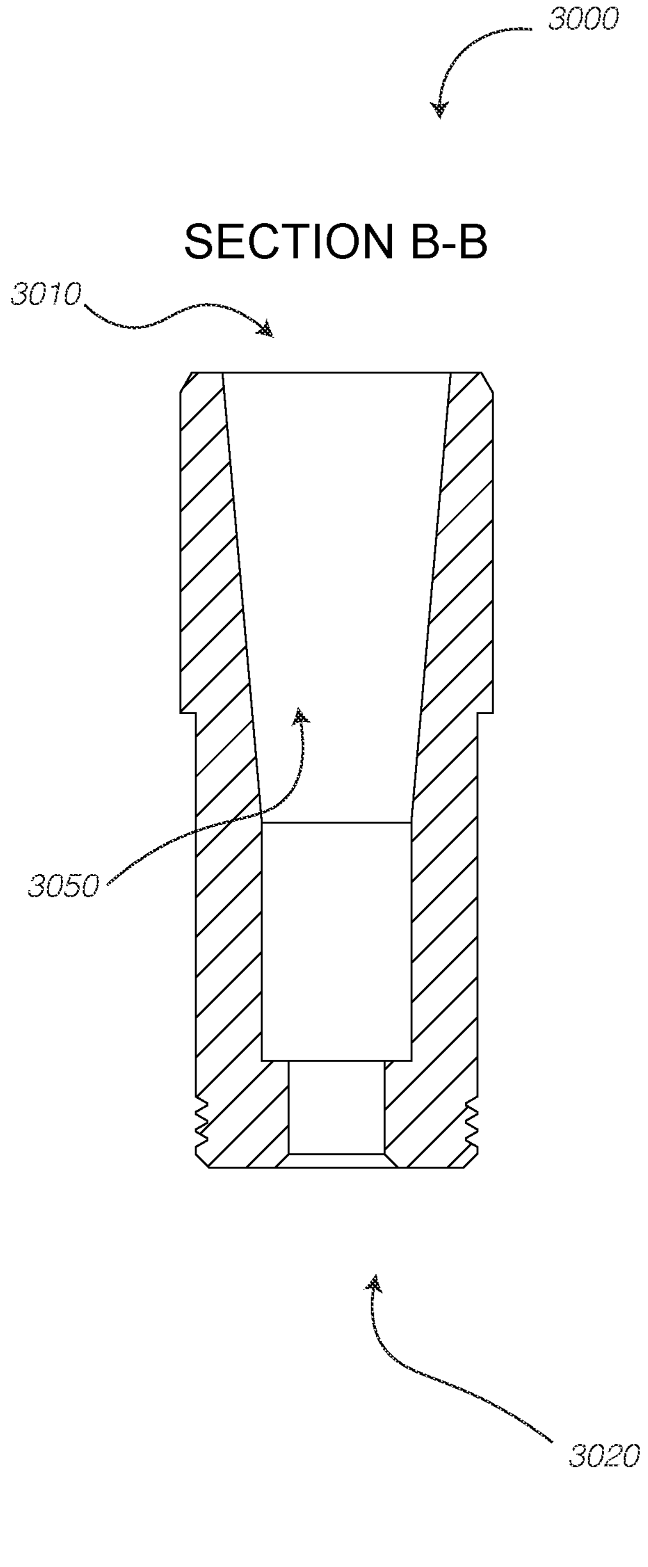
Figure 4A:
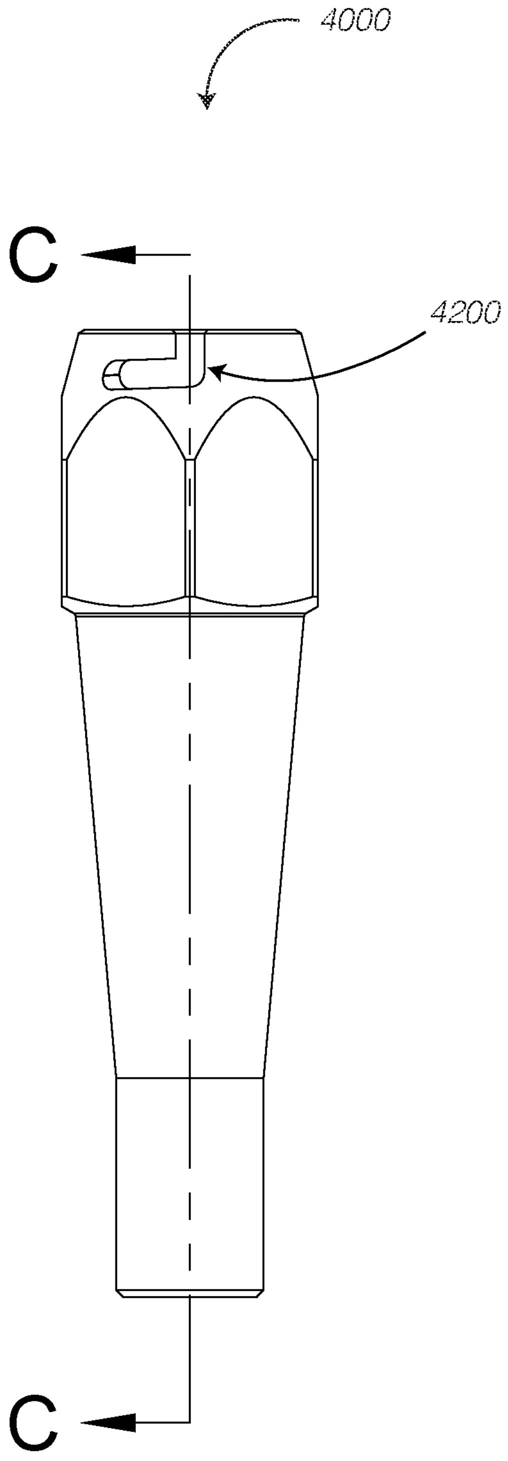
Figure 4B:
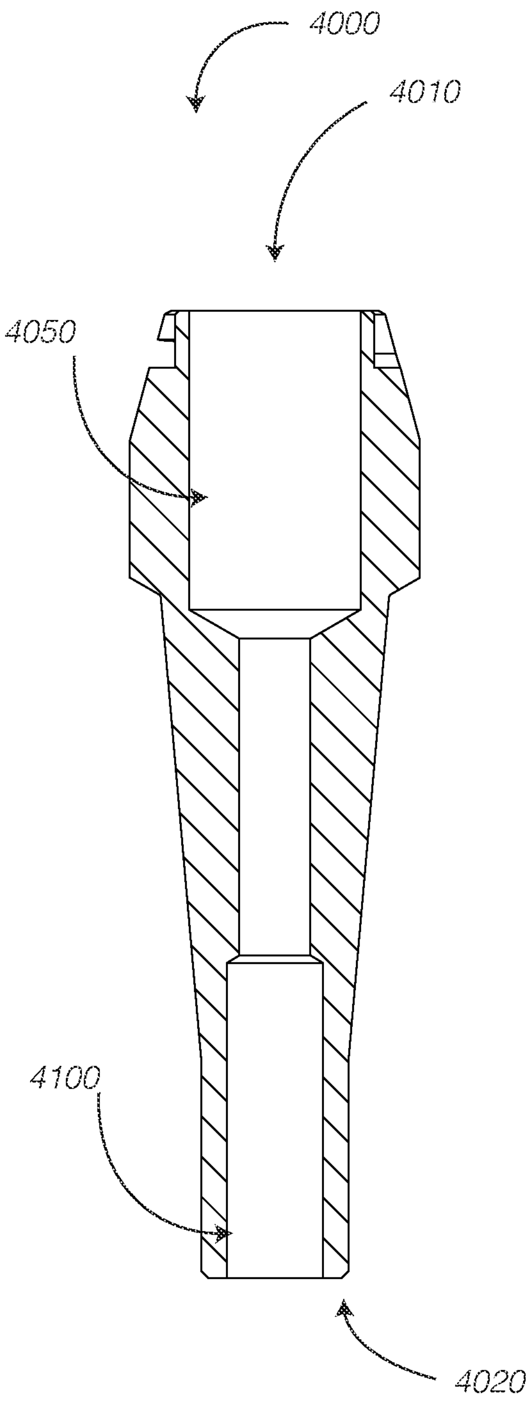
Figure 5A:
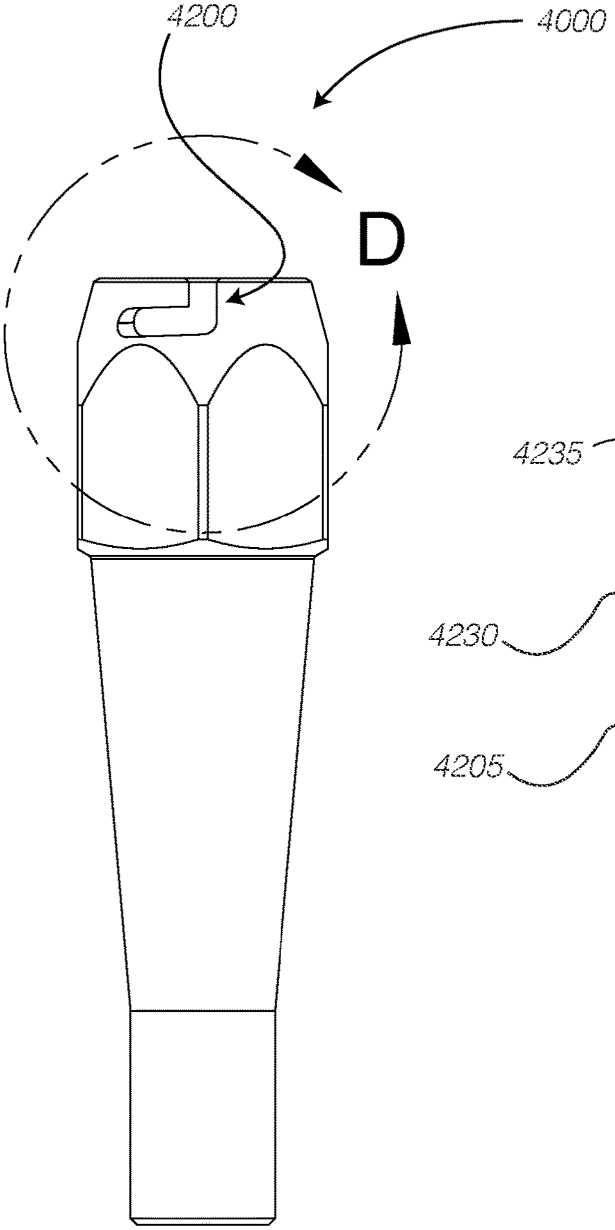
Figure 5B:
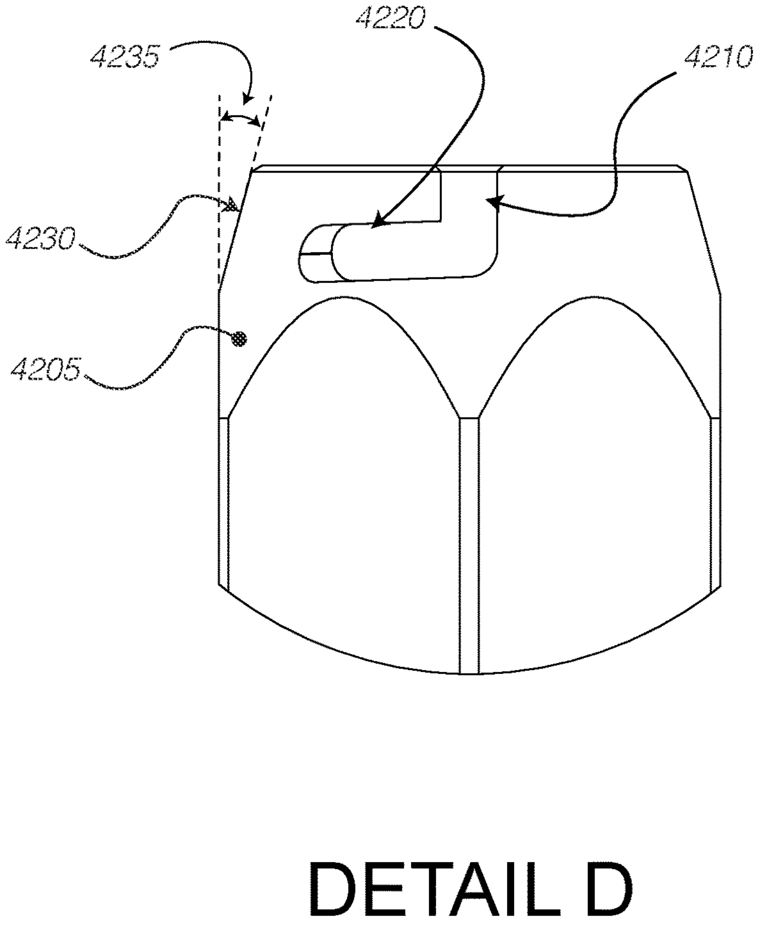
Figure 6:
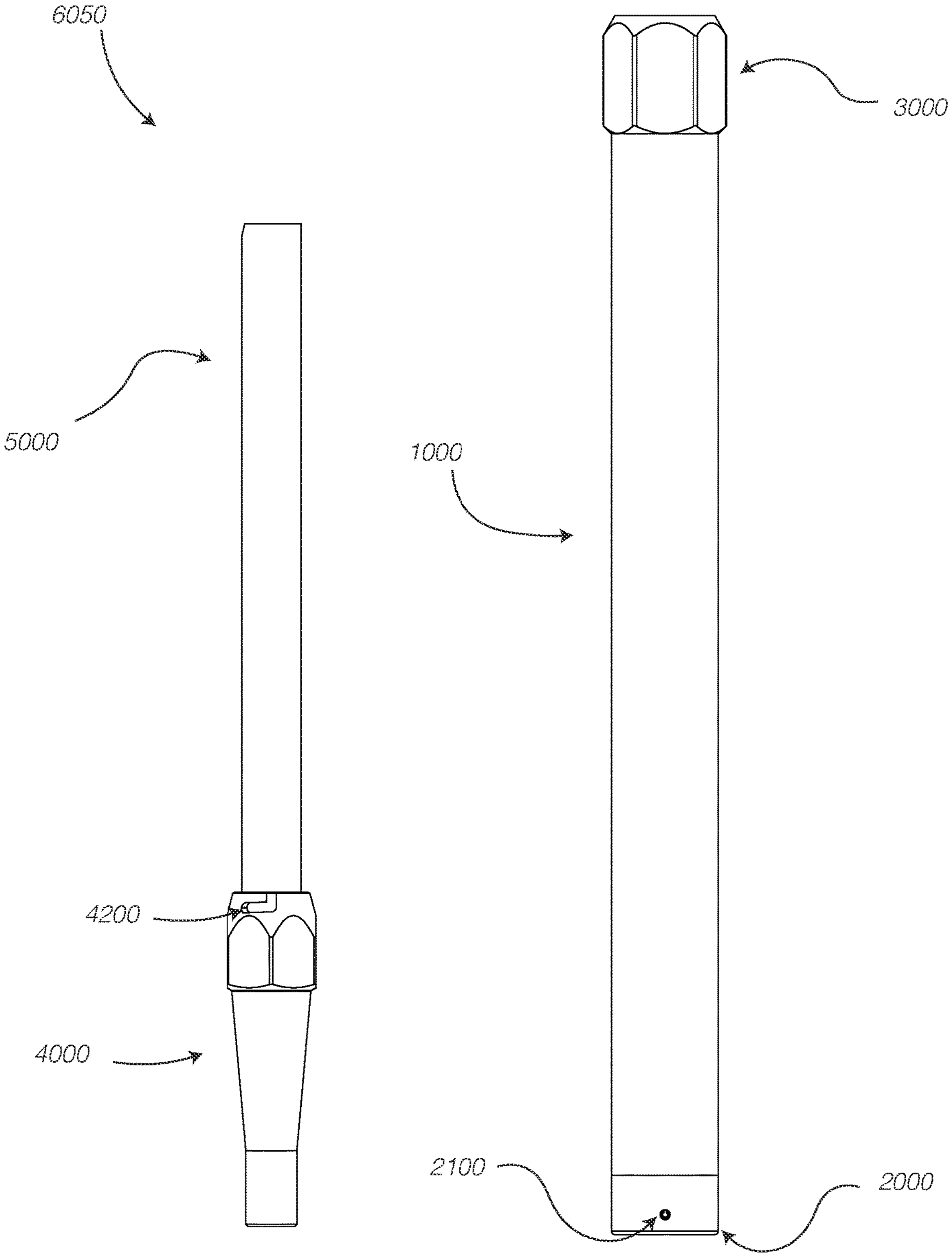
Figure 7A:
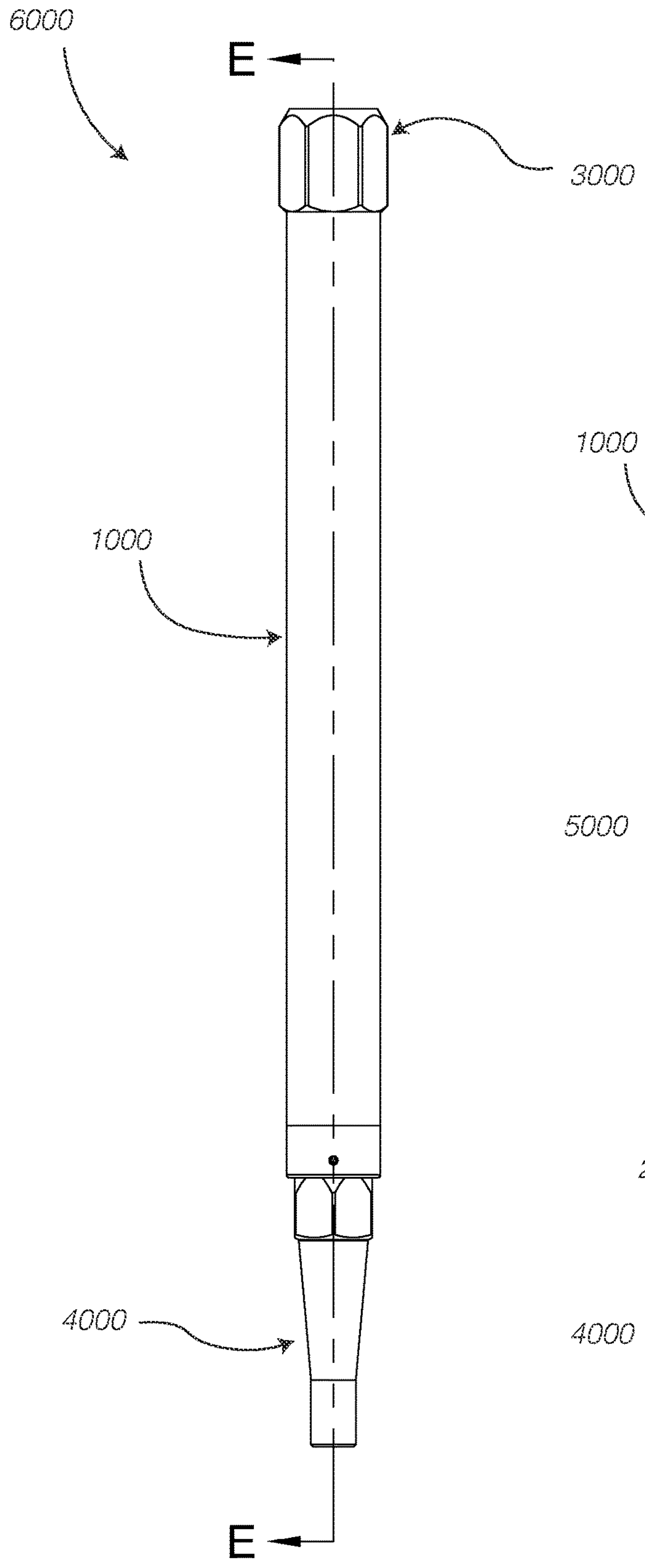
Figure 7B:
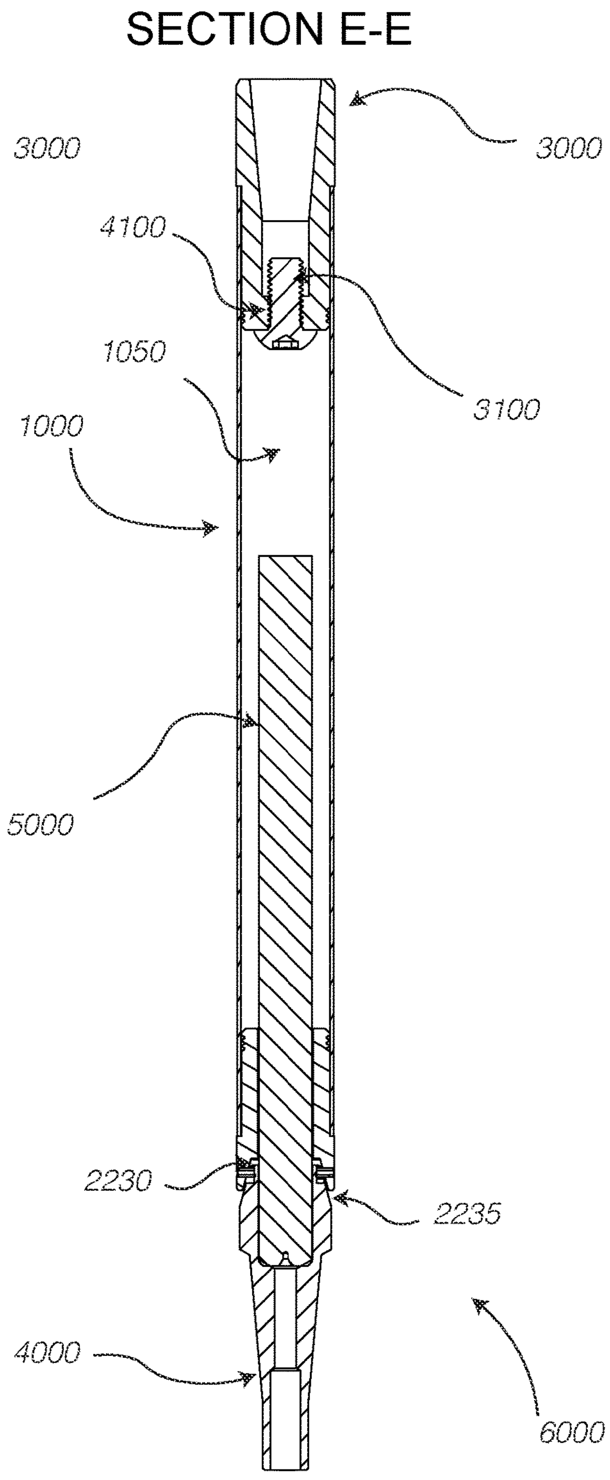
Figure 8A:
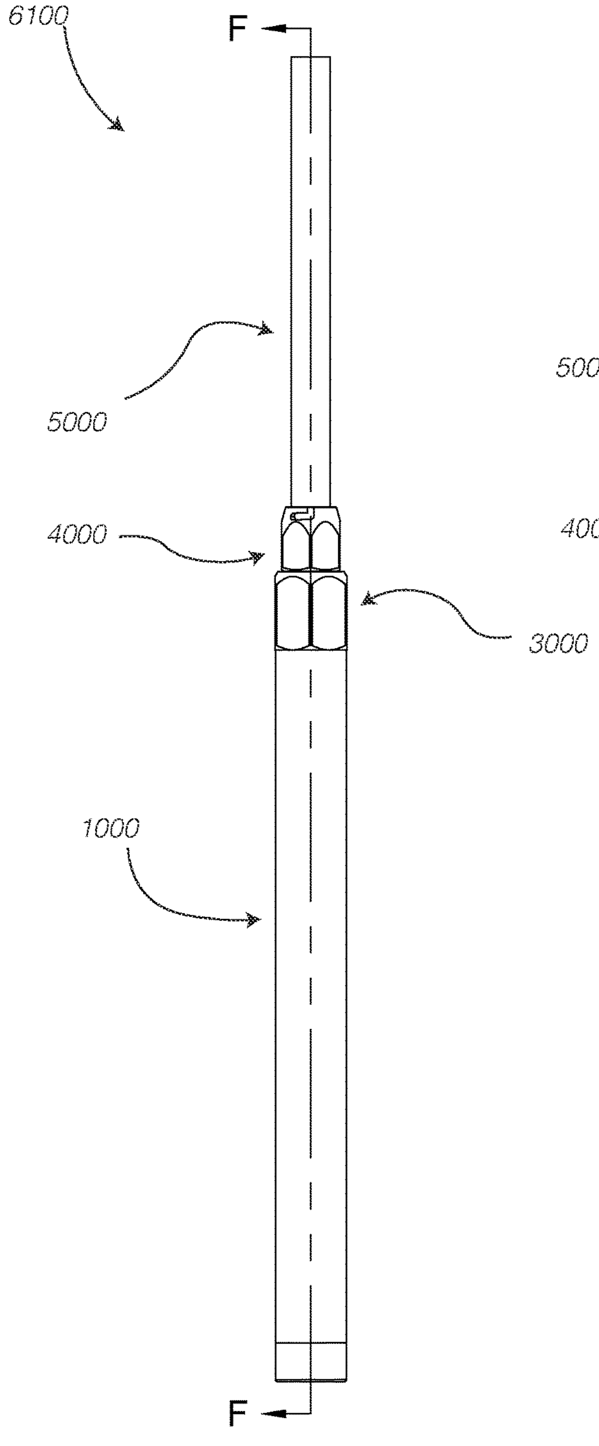
Figure 8B:
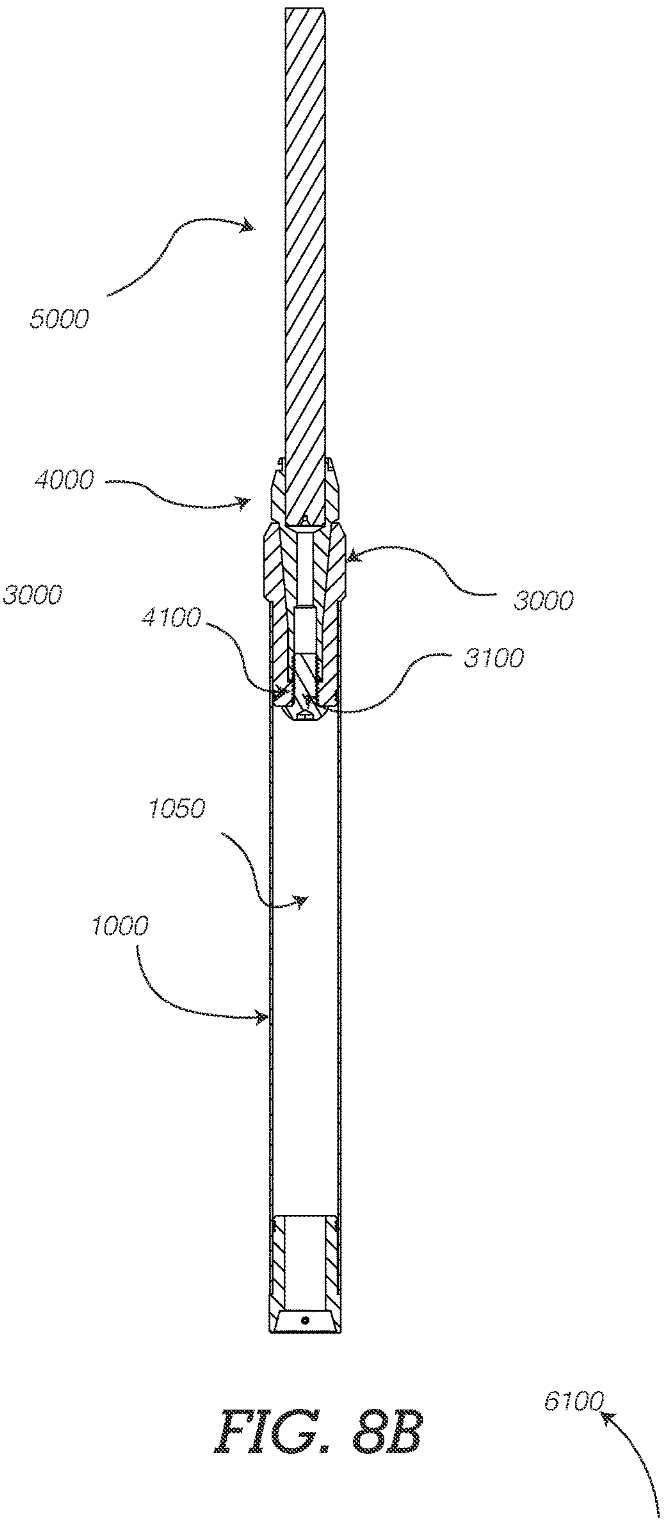

In certain embodiments—such as shown in FIG. 2B, FIG. 5B, and FIG. 7B—comprising a collet, the first end of the collet 4010 comprises a taper 4230 around at least a portion of the outer circumference of the first end 4010 of the collet thus resulting in a frustoconical form, wherein the taper comprises a taper angle 4235. The first collet receiver 2000 comprises a taper 2230 on at least a portion of the inner circumference of the first end 2010 of the first collet receiver, wherein the inner aspect 2205 of the first collet receiver comprises a frustoconical form. The taper 2230 of the first collet receiver, adjacent the hollow aspect 2050, comprises a taper angle of 2235. The taper of the first collet receiver is configured to interface with the taper 4230 of the collet when the collet 4000 is interconnected with the first collet receiver as shown in FIG. 7B. The taper 2230 of the first collet receiver provides circumferential support against the taper 4230 the collet. In certain embodiments the taper 2230 of the first collet receiver and the taper of the collet 4230 are configured to be in continuous contact wherein the taper angle 2235 of the first collet receiver and the taper angle 4235 of the collet are equal.

Embodiments wherein the taper angle 2235 of the taper of the first collet receiver is: less than the taper angle 4235 of the taper of the collet, greater than the taper angle 4235 of the taper of the collet, and equal to the taper angle 4235 of the taper of the collet—are each within the spirit and scope of the present invention.

In certain embodiments, shown in FIG. 1-FIG. 6 and FIG. 8A-FIG. 8B, for example, a collet 4000 comprises a first end 4010 and a second end 4020, wherein a woodturning tool 5000 can be interconnected with the collet 4000 by inserting the woodturning tool 5000 into the hollow aspect 4050 through the first end 4010 of the collet. The collet 4000, is interconnectable with the second collet receiver 3000 by engaging an interconnection mechanism between the collet 4000 and the second collet receiver 3000. In certain embodiments, the collet 4000 is interconnected with the second collet receiver 3000 by inserting the second end 4020 of the collet 4000 into the hollow aspect 3050 of the second collet receiver, and rotating the collet 4000 in the second direction 4120, thus placing the tool in a working configuration 6100. In certain embodiments the hollow aspect 3050 of the second collet receiver comprises a cylindrical shape, however alternate embodiments comprising cross-sections of alternate shapes such as hexagonal, octagonal, or other polygonal, or ovoid shapes are within the spirit and scope of the present invention.

Certain embodiments, shown in FIG. 1-FIG. 8B for example, comprise a collet 4000 which comprises a first end 4010 and a second end 4020, wherein a woodturning tool 5000 can be attached to the collet by inserting the woodturning tool through the first end 4010 of the collet and into the hollow aspect 4050 of the collet. A second collet receiver 3000 is configured to interconnect with the second end 4020 of the collet. The collet 4000 is interconnectable with the second collet receiver 3000 by engaging an interconnection mechanism between the collet and the second collet receiver. In certain embodiments the hollow aspect 4050 of the second collet receiver extends from the distal first end 3010 of the toward the second end 3020 of the second collet receiver. In certain embodiments, the second end of the collet comprises a female threaded feature 4100 configured to interconnect with a male threaded feature 3100 interconnected within the hollow aspect 3050 of the second collet receiver. The collet 4000 is removably interconnectable with the collet receiver by inserting the second end 4020 of the collet into the hollow aspect 3050 of the second collet receiver, and rotating the collet 4000 in the second direction 4120, thus constraining the collet 4000 and woodturning tool 5000 to the longitudinal handle 1000 placing the handle system 100 in a working configuration. The collet 4000 can be disconnected from the second collet receiver 3000 by rotating the collet 4000 in the first direction 4110. Embodiments wherein the male threaded feature 3100 and female threaded feature 4100 are interchanged, are within the spirit and scope of the present invention. Embodiments comprising interconnection mechanisms between a second collet receiver 3000 and a second end 4020 of a collet which include: threaded connections, bayonet connections, snap fit connections, press fit connections, magnetic connections and other connection mechanisms, are within the spirit and scope of the present invention.

Certain embodiments of the invention discussed herein comprise a handle 1000 with longitudinal form having a first end 1010 and a second end 1020 with a hollow aspect 1050 extending between the first end 1010 and the second end 1020 of the longitudinal handle. In certain embodiments the longitudinal handle 1000 comprises a first collet receiver 2000 at the first end 1020 of the longitudinal handle, wherein the first collet receiver 2000 is configured to interconnect with a first end 4010 of a collet, in alternate embodiments the first collet receiver 2000 is configured to interconnect with the second end 4020 of a collet. Further, certain embodiments comprise a first collet receiver 2000 and a second collet 3000 receiver. The first collet receiver 2000 is interconnected to a first distal end 1010 of the longitudinal handle wherein the first collet receiver 2000 is configured to interconnect with a first end of a collet 4010. The second collet receiver 3000 is interconnected to a second end 1020 of the longitudinal handle wherein the first distal end 3010 of the second collet receiver is configured to interconnect with a second end 4020 of the collet.

Certain embodiments of the invention discussed herein comprise a handle 1000 with longitudinal form, the handle 1000 comprises a hollow aspect 1050 extending longitudinally through the handle. The handle 1000 comprises a first collet receiver 2000 interconnected at a first end 1010 of the handle, wherein the first collet receiver 2000 is configured to interconnect with a first end 4010 of a collet. The collet receiver comprises a distal first end 2010, a second end 2020, and hollow aspect 2050 extending between the distal first end 2010 of the collet receiver and the second end 2020 of the collet receiver. The hollow aspect 2250 of the first collet receiver is configured to be in communication with the hollow aspect 1050 of the handle. A woodturning tool 5000 is interconnected with the first collet receiver 2000 wherein the woodturning tool 5000 is inserted into the hollow aspect 4050 in the first end 4010 of the collet. Thus, to interconnect the first end 4010 of the collet with the distal first end 2010 of the first collet receiver, the distal end 5010 of the woodturning tool is inserted through the hollow aspect 2050 of the first collet receiver until the first end 4010 of the collet interconnects with the distal first end 2010 of the first collet receiver, thereby storing the woodturning tool 5000 within the hollow aspect 1050 of the handle as shown in a stowed configuration 6000. The collet 4000 can be disconnected from the first collet receiver 2000 by turning the collet 4000 in a second direction 4120 and withdrawing the collet 4000 and the woodturning tool 5000 from the first collet receiver 2000.

Although embodiments shown feature a first collet receiver 2000 which are configured to interconnect with a first end 4010 of the collet, and a second collet receiver 3000 configured to interconnect with the second end 4020 of the collet, alternate embodiments wherein a first collet receiver is configured to interconnect with a first end 4010 of a collet and a second end 4020 of a collet interchangeably, thereby eliminating the need for a second collet receiver are within the spirit and scope of the present invention for certain embodiments of.

While various embodiments of the present invention have been described in detail, it is apparent that modifications and alterations of those embodiments will occur to those skilled in the art. However, it is to be expressly understood that such modifications and alterations are within the scope and spirit of the present invention. Further, the inventions described herein are capable of other embodiments and of being practiced or of being carried out in various ways. In addition, it is to be understood that the phraseology and terminology used herein is for the purposes of description and should not be regarded as limiting. The use of "including," "comprising," or "adding" and variations thereof herein are meant to encompass the items listed thereafter and equivalents thereof, as well as, additional items.

What is claimed is:

1. A handle system for woodturning tools comprising:
- a longitudinal handle;
- a collet comprising a first end, the first end of the collet comprising a hollow aspect configured to receive a woodturning tool therein;
- a first collet receiver comprising a first end configured to interconnect with the first end of the collet, and the first collet receiver further comprising a second end configured to interconnect with a first end of the longitudinal handle; and
- a second collet receiver comprising a first end configured to interconnect with a second end of the collet, and the second collet receiver further comprising a second end configured to interconnect to a second end of the longitudinal handle,
- wherein the longitudinal handle further comprises a hollow aspect extending from the first end of the longitudinal handle toward the second end of the longitudinal handle.

2. The handle system of claim 1, wherein the second end of the first collet receiver is interconnected to the first end of the longitudinal handle;
- the second end of the second collet receiver is interconnected with the second end of the longitudinal handle; and
- the first collet receiver further comprises a hollow aspect extending longitudinally therethrough from the first end of the first collet receiver through the second end of the first collet receiver,
- wherein the hollow aspect of the first collet receiver is in communication with the hollow aspect of the longitudinal handle.

3. The handle system of claim 2 wherein abutting the first end of the collet with the first end of the first collet receiver and turning the collet in a first direction places the collet in a stowed configuration, and
- wherein turning the collet in a second direction places the collet in an unlocked configuration.

4. The handle system of claim 3, wherein the interconnection between the first end of the collet and the first collet receiver comprises a bayonet mount.

5. The handle system of claim 3, wherein the first end of the collet further comprises a keyway in an external surface of the collet, wherein the keyway is configured to interconnect with a key interconnected with an internal aspect of the first collet receiver when the key and the keyway are aligned.

6. The handle system of claim 5, wherein the keyway comprises a first channel segment extending longitudinally away from the first end of the collet toward the second end of the collet; and the keyway further comprises a second channel segment extending circumferentially in the second direction around at least a portion of the collet.

7. The handle system of claim 6, further comprising a second key interconnected to the first collet receiver; and a second keyway interconnected to the collet, wherein the second key and the second keyway are configured to align when the first key and the first keyway are aligned.

8. The handle system of claim 7, wherein the second key is 180-degrees angularly offset from the first key; and the second keyway is 180-degrees angularly offset from the first keyway.

9. The handle system of claim 3, wherein the first end of the collet comprises a taper wherein the first end of the collet tapers inward at a first taper angle; and an internal aspect of the first end of the first collet receiver comprising a taper wherein the internal aspect of the first end of the first collet receiver tapers outward at a second taper angle, wherein the first end of the collet is configured to insert into the first end of the first collet receiver.

10. The handle system of claim 9 wherein the first taper angle of the collet and the second taper angle are equal.

11. The handle system of claim 9, wherein the first collet receiver is configured to receive the woodturning tool therethrough and into the hollow aspect of the longitudinal handle in the stowed configuration, and wherein the woodturning tool is constrained within the hollow aspect of the longitudinal handle, wherein the woodturning tool is maintained parallel to the longitudinal handle and prevented from impacting the longitudinal handle.

12. The handle system of claim 11, wherein the woodturning tool is maintained coaxially within the longitudinal handle when in a stowed configuration.

13. The handle system of claim 11, wherein the second end of the collet is configured to interconnect with the second collet receiver, wherein the first end of the second collet receiver comprises a hollow aspect configured to receive the second end of the collet, and wherein inserting the second end of the collet into the hollow aspect of the second collet receiver and rotating the collet in the second direction results in the collet and woodturning tool being constrained to the longitudinal handle, thereby placing the handle system in a working configuration, and wherein rotating the collet in the first direction allows the disconnection of the collet and woodturning tool from the longitudinal handle in an unlocked configuration.

14. A handle system for woodturning tools comprising:

a collet having a first end, a second end, and a hollow aspect extending therebetween;

a longitudinal handle having a first end and a second end, with a hollow aspect between the first end of the longitudinal handle and the second end of the longitudinal handle;

a first collet receiver interconnected to the first end of the longitudinal handle, wherein the first collet receiver comprises a hollow aspect longitudinally therethrough, and a distal end;

the first end of the collet comprises a first keyway and a second keyway in an external surface of the collet proximal to the first end of the collet, the keyways are radially opposed each other, the keyways each comprise a first segment extending in a first direction longitudinally away from the first end of the collet and toward the second end of the collet, and the keyways each comprising a second segment disposed at an angle to the first segment, the second segment of the keyways extending in a second direction circumferentially around at least a portion of the collet;

the first collet receiver comprises a first key and a second key interconnected with an internal surface proximal to the distal end of the first collet receiver, the keys are radially opposed to each other and are configured to slidably interconnect with the keyways of the collet, a second collet receiver interconnected to the second end of the longitudinal handle, wherein the second collet receiver comprises a hollow aspect longitudinally therethrough, and a distal end;

the distal end of the second collet receiver is configured to receive the second end of the collet into the hollow aspect of the second collet receiver, wherein the second end of the collet is inserted from the first end of the second collet receiver and advanced into the hollow aspect of the longitudinal handle;

wherein the hollow aspect of the collet is configured to receive a longitudinal tool therein through the first end of the collet;

wherein the first collet receiver is configured to interconnect with the first end of the collet, wherein the longitudinal tool is advanced through the first collet receiver, and the first end of the collet is advanced in the first direction into the second end of the first collet receiver with the keyways aligned with the keys thereby advancing the keys into the first segment of the keyways, and wherein rotating the collet in the second direction configures the collet in a locked configuration, thereby storing the longitudinal tool within the longitudinal handle.

* * * * *